United States Patent
Howard

(10) Patent No.: US 12,451,696 B2
(45) Date of Patent: Oct. 21, 2025

(54) SYSTEM AND METHOD OF DECOUPLING DRIVETRAIN RELATED POWER OSCILLATIONS OF AN INVERTER-BASED RESOURCE FROM ACTIVE POWER INJECTED INTO THE ELECTRICAL GRID

(71) Applicant: General Electric Company, Schenectady, NY (US)

(72) Inventor: Dustin F. Howard, Brookhaven, GA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 339 days.

(21) Appl. No.: 18/172,397

(22) Filed: Feb. 22, 2023

(65) Prior Publication Data

US 2024/0283248 A1 Aug. 22, 2024

(51) Int. Cl.
*H02J 3/24* (2006.01)

(52) U.S. Cl.
CPC .............. *H02J 3/24* (2013.01); *H02J 2300/28* (2020.01)

(58) Field of Classification Search
CPC ................................ H02J 3/24; H02J 2300/28
See application file for complete search history.

(56) References Cited

U.S. PATENT DOCUMENTS

| | | |
|---|---|---|
| 5,798,633 A | 8/1998 | Larsen et al. |
| 7,119,452 B2 | 10/2006 | Larsen |
| 7,423,411 B2 | 9/2008 | Sihler |
| 7,456,695 B2 | 11/2008 | Weng et al. |
| 7,804,184 B2 | 9/2010 | Yuan et al. |
| 8,510,090 B2 | 8/2013 | Hesse et al. |
| 9,270,194 B2 | 2/2016 | Brogan et al. |
| 9,467,082 B2 | 10/2016 | Garcia |

(Continued)

FOREIGN PATENT DOCUMENTS

| | | | | |
|---|---|---|---|---|
| CN | 109494709 A | 3/2019 | | |
| CN | 113949078 A | * 1/2022 | .............. | H02J 3/241 |

(Continued)

OTHER PUBLICATIONS

Machine Translation of CN113949078A by Clarivate Analytics, Jun. 2025, 16 pages.*

(Continued)

*Primary Examiner* — Harry R Behm
(74) *Attorney, Agent, or Firm* — Dority & Manning, P.A.

(57) ABSTRACT

A method for decoupling a mechanical drivetrain resonance mode of an inverter-based resource from the external electrical system includes receiving one or more voltage feedback signals at a node between the inverter-based resource and the external electrical system. The method also includes filtering the one or more voltage feedback signals to extract changes in a voltage at a frequency associated with the drivetrain resonance mode. Further, the method includes determining at least one current command or power command based on the filtered one or more voltage feedback signals. Moreover, the method includes controlling the power converter according to the at least one current command and controlling the energy buffer according to the power command so as to reduce or eliminate the changes in the voltage at the frequency associated with the drivetrain resonance mode.

20 Claims, 6 Drawing Sheets

(56) References Cited

U.S. PATENT DOCUMENTS

| | | |
|---|---|---|
| 9,660,452 B2 | 5/2017 | Routimo |
| 9,660,453 B2 | 5/2017 | Majumder |
| 9,859,828 B2 | 1/2018 | Tarnowski et al. |
| 10,156,225 B2 | 12/2018 | Huang et al. |
| 11,025,083 B2 | 6/2021 | Dharmadhikari et al. |
| 11,444,461 B2 | 9/2022 | Howard et al. |
| 2009/0200803 A1 | 8/2009 | Ichinose et al. |
| 2009/0206606 A1 | 8/2009 | Jorgensen et al. |
| 2009/0278351 A1 | 11/2009 | Rivas et al. |
| 2010/0142237 A1 | 6/2010 | Yuan et al. |
| 2011/0089693 A1* | 4/2011 | Nasiri ............... F03D 7/0272 290/44 |
| 2013/0176751 A1 | 7/2013 | Olea et al. |
| 2015/0008672 A1 | 1/2015 | Garcia |
| 2015/0148974 A1 | 5/2015 | Diedrichs |
| 2016/0285252 A1 | 9/2016 | Burra et al. |
| 2018/0159453 A1 | 6/2018 | Andersen et al. |
| 2019/0383265 A1 | 12/2019 | Hovgaard et al. |
| 2021/0285420 A1 | 9/2021 | Schwanka et al. |
| 2021/0396212 A1* | 12/2021 | Larsen ............... F03D 9/257 |
| 2023/0052292 A1 | 2/2023 | Howard et al. |
| 2023/0122027 A1 | 4/2023 | Howard et al. |

FOREIGN PATENT DOCUMENTS

| | | |
|---|---|---|
| CN | 114465291 A | 5/2022 |
| EP | 2523298 B1 | 11/2012 |
| EP | 3499675 A1 | 6/2019 |
| WO | WO 2010/069456 A2 | 6/2010 |
| WO | WO2015/131958 A1 | 9/2015 |
| WO | WO2018122726 A1 | 7/2018 |

OTHER PUBLICATIONS

EPO Search Report, Jul. 25, 2024.

Bala Kameshwar Poola et al., Placement and Implementation of Grid-Forming and Grid-Following Virtual Inertia and Fast Frequency Response, ARXIV.org, Cornell University Library, Ithaca, NY, Jul. 5, 2018, pp. 1-11.

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

* cited by examiner

SYSTEM AND METHOD OF DECOUPLING DRIVETRAIN RELATED POWER OSCILLATIONS OF AN INVERTER-BASED RESOURCE FROM ACTIVE POWER INJECTED INTO THE ELECTRICAL GRID

FIELD

The present disclosure relates in general to inverter-based resources, and more particularly to systems and methods for decoupling drivetrain related power oscillations of an inverter-based resource from active power injected into the electrical grid.

BACKGROUND

Power generating assets may take a variety of forms and rely on renewable and/or nonrenewable sources of energy. Those power generating assets relying on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor coupled to the gearbox and to the generator. The rotor and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to an electrical grid.

Wind turbines can be distinguished in two types: fixed speed and variable speed turbines. Conventionally, variable speed wind turbines are controlled as current sources connected to an electrical grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms.

Modern day wind turbine generators utilize grid-connected power converters to achieve certain special dynamic control functions (in addition to the primary control functions of regulating speed and power), such as damping drivetrain torsional oscillations and damping tower oscillations. These control functions change the active power injected into the grid at a particular frequency. The power oscillation components are usually at a known frequency dictated by the dimensions and physics of the wind turbine. These control functions are practical since grid-forming resources (mostly synchronous machines) are generally abundantly available in most applications such that these other resources can accommodate the change in active power injected by the wind turbine generators.

However, as conventional synchronous machines connected to grids may be retired or replaced in the years to come, a consequence of this structural change to the grid is that the ability of the wind turbine generator to freely change power into the grid may be more constrained. For this reason, alternative resources that can supply the power needs for these control functions would be beneficial.

In view of the foregoing, the art is continuously seeking new and improved systems and methods for decoupling drivetrain related power oscillations of an inverter-based resource from active power injected into the electrical grid.

BRIEF DESCRIPTION

Aspects and advantages of the invention will be set forth in part in the following description, or may be obvious from the description, or may be learned through practice of the invention.

In an aspect, the present disclosure is directed to a method for decoupling a mechanical drivetrain resonance mode of an inverter-based resource from the external electrical system. The inverter-based resource has a power converter, a generator, and an energy buffer. The method includes receiving, via a controller, one or more voltage feedback signals at a node between the inverter-based resource and the external electrical system. The method also includes filtering, via the controller, the one or more voltage feedback signals to extract changes in a voltage at a frequency associated with the drivetrain resonance mode. Moreover, the method includes determining, via the controller, at least one current command or power command based on the filtered one or more voltage feedback signals. Further, the method includes controlling the power converter according to the at least one current command and controlling the energy buffer according to the power command so as to reduce or eliminate the changes in the voltage at the frequency associated with the drivetrain resonance mode.

In another aspect, the present disclosure is directed to an inverter-based resource connected to an electrical grid. The inverter-based resource includes a generator, a power converter coupled to the generator, and a controller having at least one processor configured to perform a plurality of operations. The plurality of operations includes receiving one or more voltage feedback signals at a node between the inverter-based resource and the external electrical system, filtering the one or more voltage feedback signals to extract changes in voltage at a frequency associated with the drivetrain resonance mode, determining at least one current command or power command based on the filtered one or more voltage feedback signals, and controlling the power converter according to the at least one current command and controlling the energy buffer according to the power command so as to reduce or eliminate the changes in the voltage at the frequency associated with the drivetrain resonance mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

Figure 1:
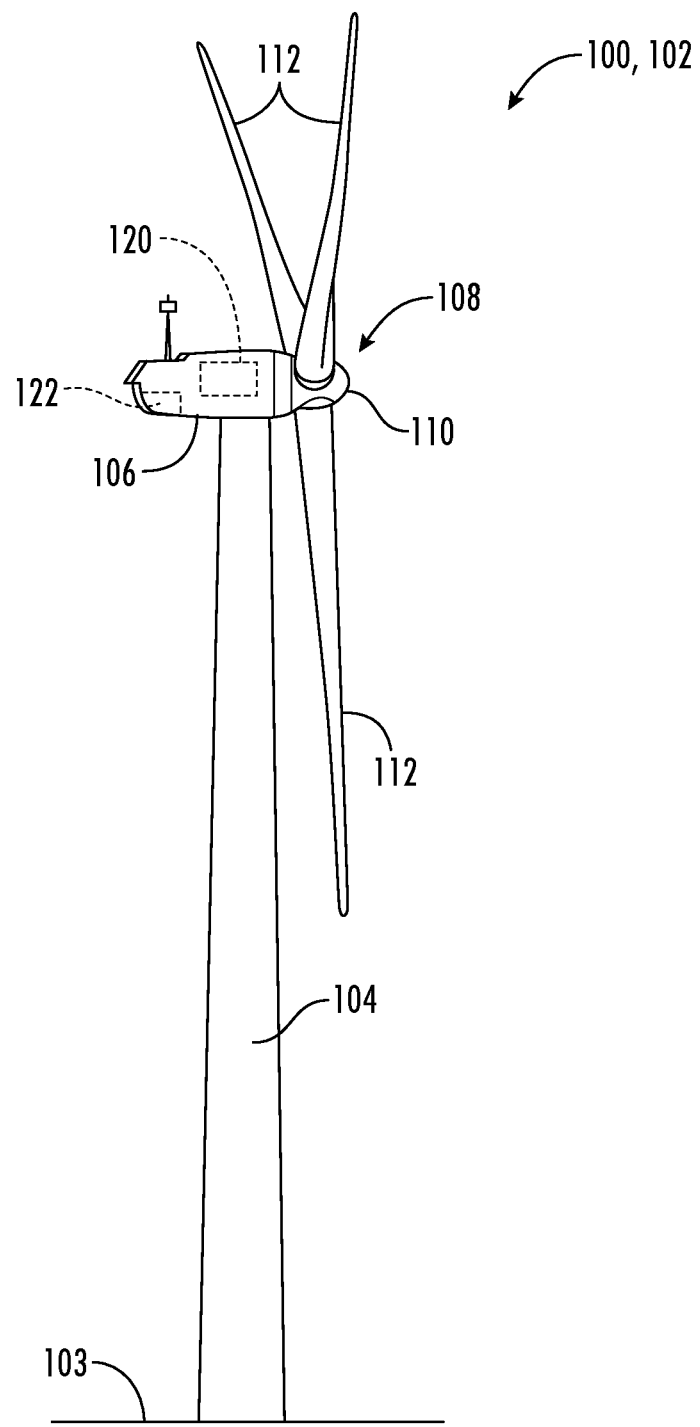
FIG. 1 illustrates a perspective view of an embodiment of an inverter-based resource configured as a wind turbine power system according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a system and method for decoupling drivetrain-related power oscillations of an inverter-based resource (that are driven by a mechanical drivetrain resonance or forced oscillation mode within an inverter-based resource) from the active power injected into the external electrical system. As such, the inverter-based resource can manage loading on the drivetrain independent of the external electrical system conditions or topology. In an embodiment, the inverter-based resource may be a wind turbine power system, a solar power system, a hydro-generator, or combinations thereof. In addition, the system and method of the present disclosure is also configured to decouple background electrical system oscillations caused by other assets connected to the external electrical system from the inverter-based resource, thereby decoupling the inverter-based resource and the external electrical system for certain types of oscillation modes. For the present disclosure, the external electrical system may be the bulk power system (e.g., the grid), a microgrid, or an electrical island in which one or more of the inverter-based resources are one of the primary generators within the network and electrical power flow is dominated by local loads.

In particular, in an embodiment, the inverter-based resource includes an energy buffer that is used to decouple power oscillations from the inverter-based resource from the total power output of the inverter-based resource. For example, in an embodiment, the power oscillations into the grid can be significantly reduced or eliminated by being absorbed by the energy buffer. Further, in an embodiment, the power rating of the energy buffer may be relatively small with respect to the inverter-based resource rating (e.g., from about 5% to about 10% of the rating). The energy buffer may include a battery energy storage device, one or more capacitors, or a resistive element (such as a dynamic brake), or combinations thereof. In an embodiment, if a resistive element is used for the energy buffer, an 'offset' power may be required to achieve a bidirectional change in power to decouple the oscillations. Accordingly, in an embodiment, to achieve the intended behavior, the energy buffer is controlled in such a way to create a "stiff" terminal voltage at predetermined frequencies associated with a mechanical resonance mode of the IBR. By creating this stiff voltage, the change in power caused by the inverter-based resource can be absorbed by the energy buffer.

Similarly, any oscillations in grid voltage magnitude, frequency, or angle at the predetermined frequency would be decoupled from the inverter-based resource, thereby buffering the inverter-based resource from any background oscillations in the grid itself or from other grid-forming or grid-following devices connected nearby. This is particularly important for grid-forming inverter-based resources, where active power generated is sensitive to these grid oscillations.

In an embodiment, the systems and methods of the present disclosure employ an algorithm for creating a stiff voltage at the inverter-based resource terminals at certain predetermined frequencies. For example, in an embodiment, the algorithm is configured to receive and filter one or more voltage feedback signals relating to a voltage at a frequency associated with the drivetrain resonance mode to extract changes in the voltage at the frequency associated with the drivetrain resonance mode. Thus, the algorithm is configured to determine at least one shunt current command or shunt power command based on the filtered one or more voltage feedback signals. Accordingly, the algorithm is further configured to control the power converter according to the current command and the energy buffer according to the power command so as to reduce or eliminate the changes in the voltage at the frequency associated with the drivetrain resonance mode.

More specifically, in particular embodiments, for example, the algorithm includes receiving x and y voltage feedbacks calculated based on abc feedback signals and synchronous reference frame transformation. The voltage feedbacks can then be filtered, e.g., via a high pass filter, to remove direct current (DC) components associated with fundamental frequency. Moreover, in an embodiment, the algorithm includes calculating an angle rotating at a desired pre-determined frequency associated with the inverter-based resource. In addition, the algorithm is configured to rotate the filtered voltage feedback to a reference frame rotating at the desired pre-determined frequency. In this reference frame, components of the terminal voltage oscillating at the desired pre-determined frequency appear as DC signals. Furthermore, the rotated voltage feedbacks may again be filtered, e.g., via a low pass filter to remove higher-frequency components not associated with frequency components of interest. The calculated voltage feedbacks can then be used in an integral controller, where the intended reference voltage at this frequency is set to zero (0). In such embodiments, the output of the integral controller may be a shunt current injection need to drive the changes in voltage at the pre-determined frequency to zero. As such, in an embodiment, the algorithm includes rotating the desired current back to the synchronous reference frame. This rotation may also include a predetermined phase shift setting that can be tuned for the application. Thus, the algorithm is configured to calculate a change to a power command for the energy buffer and/or a change for a reactive current command to the power converter (e.g., particularly the line side converter in wind turbine applications).

Referring now to the drawings, FIG. 1 illustrates a perspective view of one embodiment of a inverter-based resource 100 according to the present disclosure. As shown, the inverter-based resource 100 may be configured as a wind turbine 102. In an additional embodiment, the inverter-based resource 100 may, for example, be configured as a hydroelectric plant, a fossil fuel generator, and/or a hybrid power generating asset.

When configured as a wind turbine 102, the inverter-based resource 100 may generally include a tower 104 extending from a support surface 103, a nacelle 106 mounted on the tower 104, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 200 (FIG. 2) positioned within the nacelle 106 to permit electrical energy to be produced.

The wind turbine 102 may also include a controller 120 centralized within the nacelle 106. However, in other embodiments, the controller 120 may be located within any other component of the wind turbine 102 or at a location outside the wind turbine 102. Further, the controller 120 may be communicatively coupled to any number of the components of the wind turbine 102 in order to control the components. As such, the controller 120 may include a computer or other suitable processing unit. Thus, in several embodiments, the controller 120 may include suitable computer-readable instructions that, when implemented, configure the controller 120 to perform various different functions, such as receiving, transmitting and/or executing wind turbine control signals.

Furthermore, as depicted in FIG. 1, in an embodiment, the inverter-based resource 100 may include at least one operational sensor 122. The operational sensor(s) 122 may be configured to detect a performance of the inverter-based resource 100, e.g., in response to the environmental condition. In an embodiment, the operational sensor(s) 122 may be configured to monitor a plurality of electrical conditions, such as slip, stator voltage and current, rotor voltage and current, line-side voltage and current, DC-link charge and/or any other electrical condition of the inverter-based resource 100.

It should also be appreciated that, as used herein, the term "monitor" and variations thereof indicates that the various sensors of the inverter-based resource 100 may be configured to provide a direct measurement of the parameters being monitored or an indirect measurement of such parameters. Thus, the sensor(s) 122 described herein may, for example, be used to generate signals relating to the parameter being monitored, which can then be utilized by the controller 120 to determine a condition or response of the inverter-based resource 100.

Figure 2:
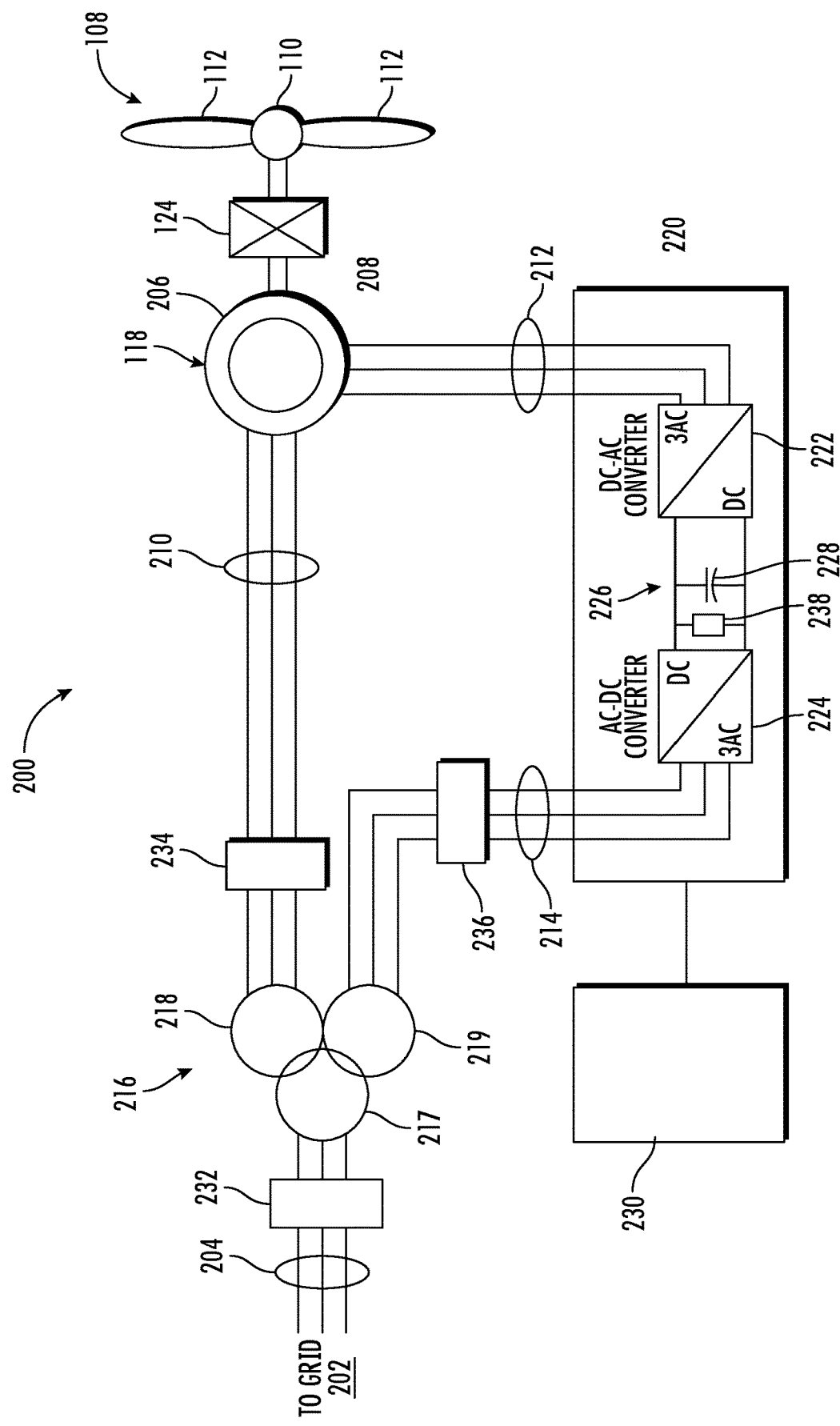
FIG. 2 illustrates a schematic diagram of an embodiment of an electrical system for use with an inverter-based resource configured as a wind turbine power system according to the present disclosure.

Referring now to FIG. 2, wherein an exemplary electrical system 200 of the inverter-based resource 100 is illustrated. As shown, the generator 118 may be coupled to the rotor 108 (e.g., either directly or through a gearbox 124) for producing electrical power from the rotational energy generated by the rotor 108. Accordingly, in an embodiment, the electrical system 200 may include various components for converting the kinetic energy of the rotor 108 into an electrical output in an acceptable form to an electrical grid 202 via grid bus 204. For example, in an embodiment, the generator 118 may be a double-fed induction generator (DFIG) having a stator 206 and a generator rotor 208. The generator 118 may be coupled to a stator bus 210 and a power converter 220 via a rotor bus 212. In such a configuration, the stator bus 210 may provide an output multiphase power (e.g., three-phase power) from a stator of the generator 118, and the rotor bus 212 may provide an output multiphase power (e.g., three-phase power) of the generator rotor 208 of the generator 118. Additionally, the generator 118 may be coupled via the rotor bus 212 to a rotor side converter 222. The rotor side converter 222 may be coupled to a line-side converter 224 which, in turn, may be coupled to a line-side bus 214.

In an embodiment, the rotor side converter 222 and the line-side converter 224 may be configured for normal operating mode in a three-phase, pulse width modulation (PWM) arrangement using insulated gate bipolar transistors (IGBTs) Other suitable switching devices may be used, such as insulated gate commuted thyristors, MOSFETs, bipolar transistors, silicone-controlled rectifiers, and/or other suitable switching devices. Furthermore, as shown, the rotor side converter 222 and the line-side converter 224 may be coupled via a DC link 226 across a DC link capacitor 228. In addition, as shown, the power converter 220 may include an energy buffer 238, such as a battery energy storage device, one or more capacitors, or a resistive element (such as a dynamic brake), or combinations thereof.

In an embodiment, the power converter 220 may be coupled to the controller 120 configured as a converter controller 230 to control the operation of the power converter 220. For example, the converter controller 230 may send control commands to the rotor side converter 222 and the line-side converter 224 to control the modulation of switching elements used in the power converter 220 to establish a desired generator torque setpoint and/or power output.

As further depicted in FIG. 2, the electrical system 200 may, in an embodiment, include a transformer 216 coupling the inverter-based resource 100 to the electrical grid 202 (or another type of electrical system, such as a microgrid or electrical island with loads). The transformer 216 may, in an embodiment, be a three-winding transformer which includes a high voltage (e.g., greater than 12 KVAC) primary winding 217. The high voltage primary winding 217 may be coupled to the electrical grid 179. The transformer 216 may also include a medium voltage (e.g., 6 KVAC) secondary winding 218 coupled to the stator bus 210 and a low voltage (e.g., 575 VAC, 690 VAC, etc.) auxiliary winding 219 coupled to the line bus 214. It should be appreciated that the transformer 216 can be a three-winding transformer as depicted, or alternatively, may be a two-winding transformer having only the primary winding 217 and the secondary winding 218; may be a four-winding transformer having the primary winding 217, the secondary winding 218, the auxiliary winding 219, and an additional auxiliary winding; or may have any other suitable number of windings.

In an embodiment, the electrical system 200 may include various protective features (e.g., circuit breakers, fuses, contactors, and other devices) to control and/or protect the various components of the electrical system 200. For example, the electrical system 200 may, in an embodiment, include a grid circuit breaker 232, a stator bus circuit breaker 234, and/or a line bus circuit breaker 236. The circuit breaker(s) 232, 234, 236 of the electrical system 200 may connect or disconnect corresponding components of the electrical system 200 when a condition of the electrical system 200 approaches a threshold (e.g., a current threshold and/or an operational threshold) of the electrical system 200.

Figure 3:
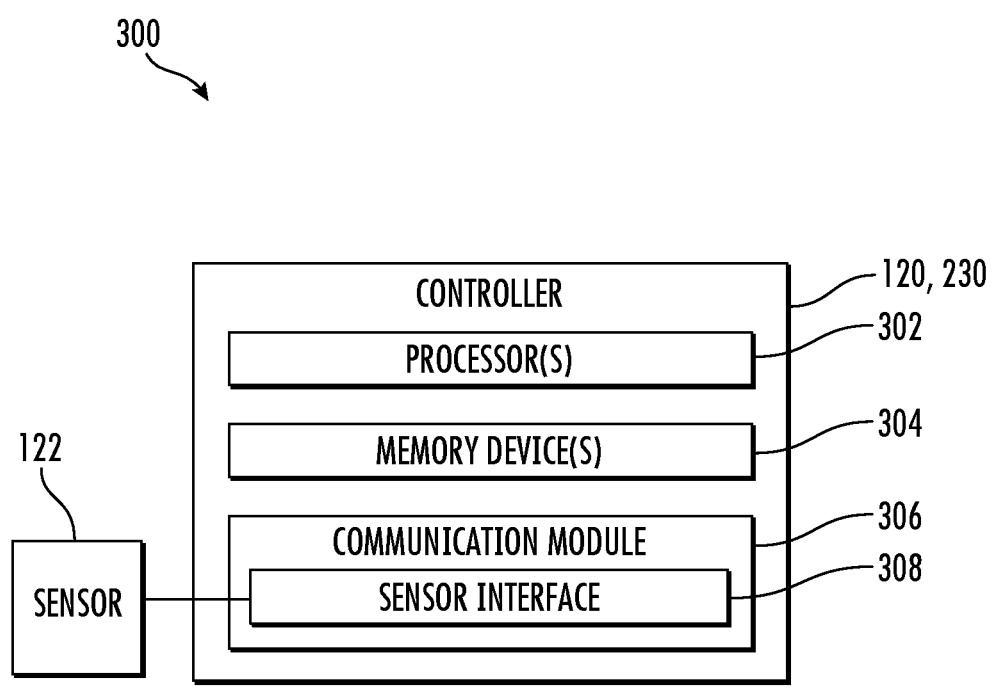
FIG. 3 illustrates a block diagram of an embodiment of a controller for use with an inverter-based resource according to the present disclosure.

Referring now to FIG. 3, a block diagram of an embodiment of suitable components that may be included within a controller 300 of the inverter-based resource 100, such as the wind turbine 102, is illustrated. For example, as shown, the controller 300 may be the turbine controller 120 or the converter controller 230. Further, as shown, the controller 120 includes one or more processor(s) 302 and associated memory device(s) 304 configured to perform a variety of computer-implemented functions (e.g., performing the methods, steps, calculations and the like and storing relevant data as disclosed herein). Additionally, the controller 300, may also include a communications module 306 to facilitate communications between the controller 300, and the various components of the inverter-based resource 100. Further, the communications module 306 may include a sensor interface 308 (e.g., one or more analog-to-digital converters) to permit signals transmitted from the sensor(s) 122 to be converted into signals that can be understood and processed by the processors 302. It should be appreciated that the sensor(s) 122 may be communicatively coupled to the communications module 306 using any suitable means. For example, the sensor(s) 122 may be coupled to the sensor interface 308 via a wired connection. However, in other embodiments, the sensor(s) 122 may be coupled to the sensor interface 308 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 304 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 304 may generally be configured to store suitable computer-readable instructions that, when implemented by the processor(s) 302, configure the controller 300 to perform various functions as described herein, as well as various other suitable computer-implemented functions.

Figure 4:
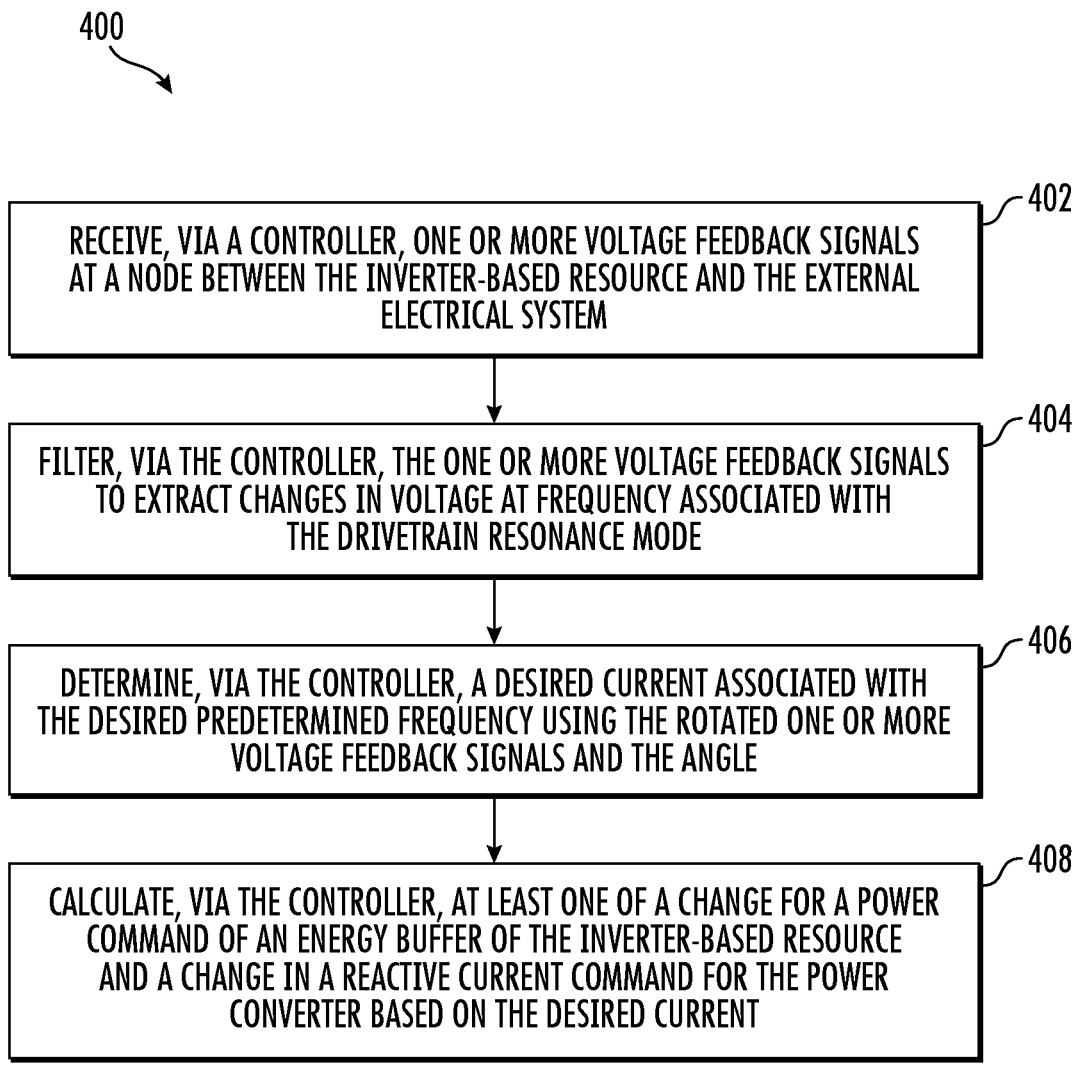
FIG. 4 illustrates a flow diagram of one embodiment of a method for decoupling power oscillations from an inverter-based resource connected to an electrical grid from a total power output of the inverter-based resource according to the present disclosure.

Referring now to FIG. 4, a flow diagram of an embodiment of a method 400 for decoupling power oscillations from an inverter-based resource, such as inverter-based resource 100, connected to an electrical grid from a total power output of the inverter-based resource is illustrated according to the present disclosure. The method 400 may be implemented using, for instance, the controller 300 of the present disclosure discussed above with references to FIGS. 1-3. FIG. 4 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 includes receiving, via a controller, one or more voltage feedback signals at a node between the inverter-based resource and the external electrical system. As shown at (404), the method 400 includes filtering, via the controller, the one or more voltage feedback signals to extract changes in the voltage at the frequency associated with the drivetrain resonance mode. As shown at (406), the method 400 includes determining, via the controller, at least one current command or power command based on the filtered one or more voltage feedback signals. As shown at (408), the method 400 includes controlling the power converter according to the at least one current command and controlling the energy buffer according to the power command so as to reduce or eliminate the changes in the voltage at the frequency associated with the drivetrain resonance mode.

Figure 5:
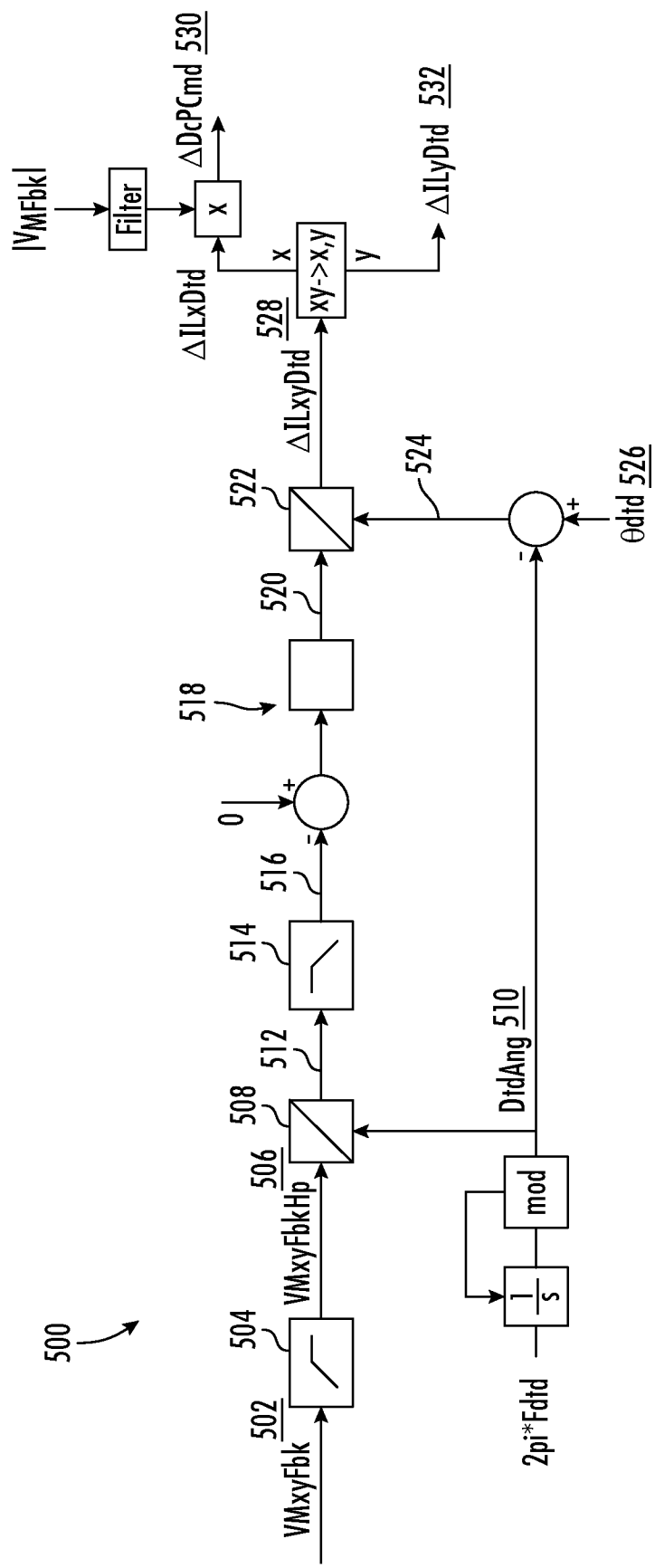
FIG. 5 illustrates a schematic diagram of an embodiment of an algorithm implemented by a controller for decoupling power oscillations from an inverter-based resource connected to an electrical grid from a total power output of the inverter-based resource according to the present disclosure.

The method 400 of FIG. 4 can be better understood with reference to FIG. 5. In particular, FIG. 5 illustrates a schematic diagram of an embodiment of an algorithm 500 that can be implemented by the controller 300 for decoupling power oscillations from an inverter-based resource, such as inverter-based resource 100, connected to an electrical grid from a total power output of the inverter-based resource is illustrated according to the present disclosure. As shown, the algorithm 500 receives one or more inputs. In particular embodiments, as shown, the input(s) may include, for example, one or more voltage feedback signals 502 relating to a voltage at a frequency associated with the drivetrain resonance mode. In particular, as shown, the voltage feedback signal(s) 502 may include x and y voltage feedback signals (e.g., VMxyFbk). These x and y voltage feedbacks correspond to voltages at a node between the electrical system and the IBR, such as voltages at the primary winding of the IBR terminals or the secondary of the IBR terminals (or other node through which the entirety of output current of the IBR flows). In addition, as shown, the algorithm 500 is configured to calculate an angle 510 (e.g., DtdAng) rotating at a desired predetermined frequency (e.g., Fdtd) associated with the inverter-based resource 100.

Further, in an embodiment, as shown, the algorithm 500 may include filtering the voltage feedback signal(s) to extract changes in the voltage at the frequency associated with the drivetrain resonance mode. In particular embodiments, as shown, the algorithm 500 may include filtering, via a first filter 504, the voltage feedback signal(s) 502 to remove one or more direct current (DC) components associated with a fundamental frequency. An output of the first filter 504 is represented as 506 in FIG. 5. For example, as shown, the first filter 504 may be a high-pass filter. In addition, as shown, the algorithm 500 is configured to filter, via a second filter 514, the voltage feedback signals 502 to remove high frequency components not associated with the desired predetermined frequency. An output of the second filter 514 is represented as 516 in FIG. 5. In certain embodiments, for example, the second filter 514 may be a low-pass filter.

In further embodiments, as shown at 508, the algorithm 500 may also include rotating the filtered voltage feedback signals 506 (e.g., VMxyFbkHp) (i.e., after the first filter 504) from a synchronous reference frame to a reference frame rotating at the desired predetermined frequency based on the angle 510. The rotated signal is represented as 512 in FIG. 5. In such embodiments, in the reference frame, components of a terminal voltage of the inverter-based resource 100 oscillating at the desired predetermined frequency appear as direct current (DC) signals. Thus, as shown, the second filtering step can be employed after rotating the filtered voltage feedback signals 506 (e.g., VMxyFbkHp) from the synchronous reference frame to the reference frame rotating at the desired predetermined frequency based on the angle 510.

Moreover, as shown, the algorithm 500 is further configured to determine at least one current command 532 (ΔILyDtd) or a power command 530 (e.g., ΔDcPCmd) based on the filtered voltage feedback signal(s) (represented by 516). The at least one current command or power command are intended to be reflected as shunt (or parallel) current/power injection at the node (or close to) for which the changes in voltage are being measured (for example, in a double-fed type generator, this can naturally be injected through the line-side converter since it injects a shunt current/power at a node between the external electrical system and the IBR generator). More specifically, as shown, the algorithm 500 is configured to generate, via an integral controller 518, an output 520 using the rotated voltage feedback signal(s) 516. In such embodiments, as shown, an intended reference voltage at the desired predetermined frequency (e.g., Fdtd) of the integral controller 518 is set to zero (0) and the output 520 of the integral controller 518 is the desired current associated with the desired predetermined frequency.

Thus, in an embodiment, as shown at 522, the algorithm 500 is configured to determine the current command 532 (ΔILyDtd) or a power command 530 (e.g., ΔDcPCmd) based on the filtered one or more voltage feedback signals 516 by rotating the output 520 associated with the desired predetermined frequency back to the synchronous reference frame to generate a desired current 528 (e.g., ΔILxyDtd). Accordingly, in such embodiments, the algorithm 500 is configured to determine the current command 532 (ΔILyDtd) or a power command 530 (e.g., ΔDcPCmd) based on the desired current 528.

Still referring to FIG. 5, as shown, the algorithm 500 may also apply a predetermined phase shift setting 524 during the rotation at 522. In such embodiments, the predetermined phase shift setting 524 may be determined as a function of the angle 510 and a drivetrain angle 526 (e.g., θdtd). In an embodiment, the drivetrain angle 526 may be tuned at the design stage to give a reasonable decoupling of grid/drivetrain oscillations for a wide range of possible external electrical system types. Alternatively, this setting may be tuned on a site-by-site basis to optimize performance for the application.

Figure 6:
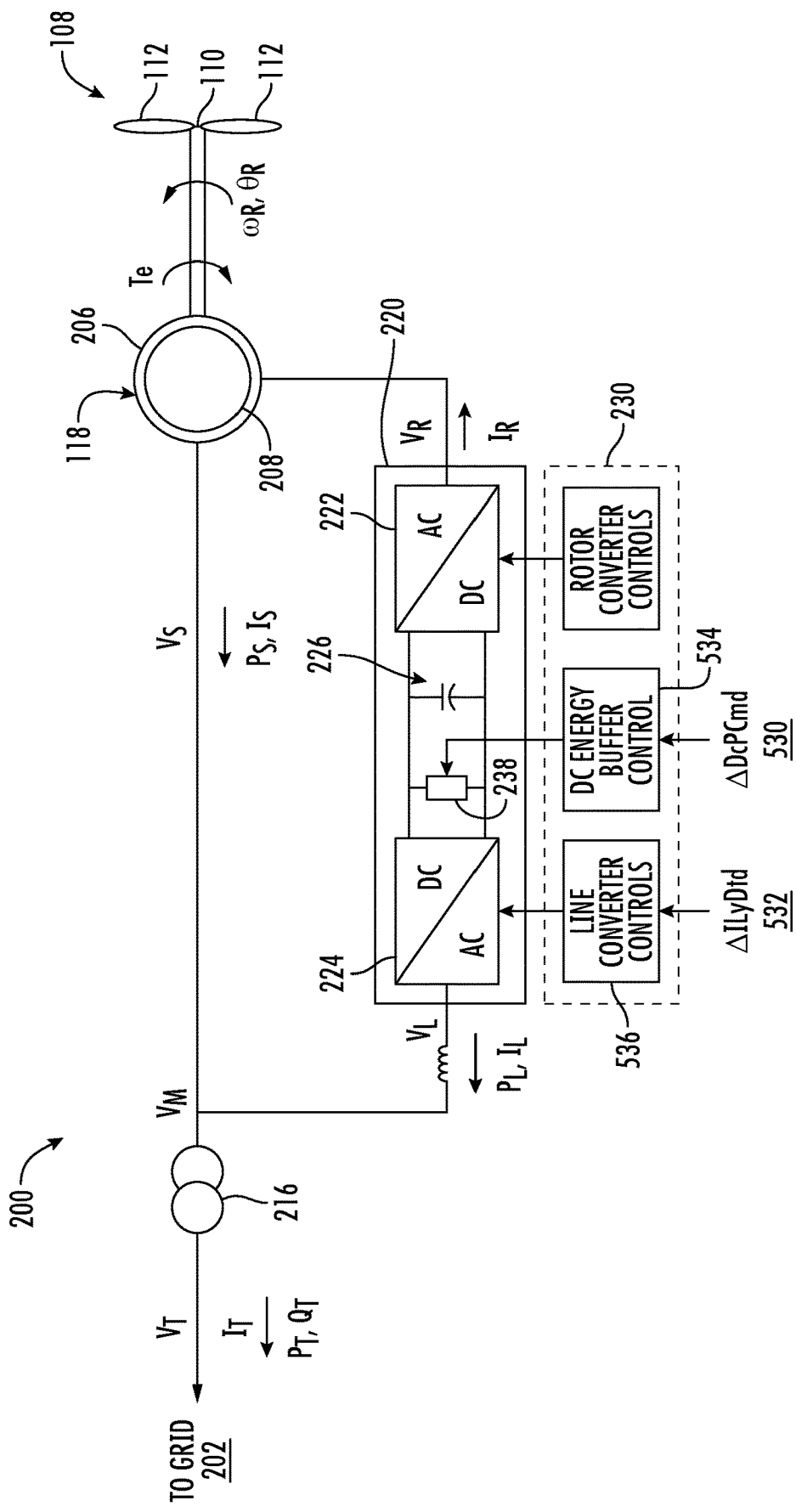
FIG. 6 illustrates a schematic diagram of an embodiment of an electrical system for use with a inverter-based resource configured as a wind turbine power system according to the present disclosure, particularly illustrating a change for a power command of an energy buffer of the inverter-based resource and a change in the reactive current command for a power converter being sent to an energy buffer control and a line converter control, respectively.

Thus, as shown in FIG. 6, the current command 532 (ΔILyDtd) or a power command 530 (e.g., ΔDcPCmd) can be sent to an energy buffer control 534 and a line converter control 536, respectively, e.g., of the converter controller 230. In an embodiment, if the energy buffer 238 is a dynamic brake, the algorithm 500 may be selectively enabled upon detection of an island condition. Otherwise, in an embodiment, the algorithm 500 may operate continuously.

Accordingly, the current command 532 (ΔILyDtd) or a power command 530 (e.g., ΔDcPCmd) is configured to achieve the intended behavior to decouple power oscillations from the inverter-based resource 100 from a total power output of the inverter-based resource 100. In particular embodiments, for example, the energy buffer 238 is controlled in such a way to create a "stiff" terminal voltage (e.g., $V_M$ in FIG. 6) at predetermined frequencies. By creating this stiff voltage, the change in power caused by the wind turbine 102 can be absorbed by the energy buffer 238.

Similarly, any oscillations in grid voltage magnitude, frequency, or angle at the predetermined frequency are decoupled from the wind turbine 102, thereby buffering the wind turbine 102 from any background oscillations in the grid itself or from other grid-forming or grid-following devices connected nearby. This is particularly important for grid-forming wind turbines, where active power generated is sensitive to these grid oscillations.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Further aspects of the invention are provided by the subject matter of the following clauses:

A method for decoupling a mechanical drivetrain resonance mode of an inverter-based resource from the external electrical system, the inverter-based resource having a power converter, a generator, and an energy buffer, the method comprising: receiving, via a controller, one or more voltage feedback signals at a node between the inverter-based resource and the external electrical system; filtering, via the controller, the one or more voltage feedback signals to extract changes in a voltage at a frequency associated with the drivetrain resonance mode; determining, via the controller, at least one current command or power command based on the filtered one or more voltage feedback signals; and controlling the power converter according to the at least one current command and controlling the energy buffer according to the power command so as to reduce or eliminate the changes in the voltage at the frequency associated with the drivetrain resonance mode.

The method of any preceding clause, wherein the one or more voltage feedback signals comprise x and y voltage feedback signals.

The method of any preceding clause, further comprising calculating, via the controller, an angle rotating at a desired predetermined frequency associated with the inverter-based resource.

The method of any preceding clause, wherein filtering the one or more voltage feedback signals to extract the changes in the voltage at the frequency associated with the drivetrain resonance mode further comprises: filtering, via a first filter, the one or more voltage feedback signals to remove one or more direct current (DC) components associated with a fundamental frequency; and subsequently filtering, via a second filter, the one or more voltage feedback signals to remove high frequency components not associated with the desired predetermined frequency.

The method of any preceding clause, wherein the first filter is a high-pass filter and the second filter is a low-pass filter.

The method of any preceding clause, further comprising: rotating, via the controller, the one or more voltage feedback signals from a synchronous reference frame to a reference frame rotating at the desired predetermined frequency after filtering via the first filter and before filtering via the second filter, wherein in the reference frame, components of a terminal voltage of the inverter-based resource oscillating at the desired predetermined frequency appear as direct current (DC) components.

The method of any preceding clause, wherein determining the at least one current command or the power command based on the filtered one or more voltage feedback signals further comprises: generating, via an integral controller of the controller, an output using the rotated one or more voltage feedback signals, wherein an intended reference voltage at the desired predetermined frequency of the integral controller is set to zero (0) and the output of the integral controller is a shunt current injection needed to drive the changes in the voltage at the predetermined frequency to zero.

The method of any preceding clause, wherein determining the at least one current command or the power command based on the filtered one or more voltage feedback signals further comprises: rotating the output associated with the desired predetermined frequency back to the synchronous reference frame to generate a desired current; and determining the at least one current command or the power command based on the desired current.

The method of any preceding clause, wherein rotating the output associated with the desired predetermined frequency back to the synchronous reference frame further comprises applying a predetermined phase shift setting.

The method of any preceding clause, wherein the energy buffer comprises one of a dynamic brake, a capacitor, or a battery.

The method of any preceding clause, wherein the inverter-based resource comprises one of a wind turbine power system, a solar power system, a hydro-generator, or combinations thereof.

An inverter-based resource connected to an external electrical system, the inverter-based resource comprising: a generator; an energy buffer; a power converter coupled to the generator; and a controller comprising at least one processor configured to perform a plurality of operations, the plurality of operations comprising: receiving one or more voltage feedback signals at a node between the inverter-based resource and the external electrical system; filtering the one or more voltage feedback signals to extract changes in voltage at a frequency associated with a drivetrain resonance mode; determining at least one current command or power command based on the filtered one or more voltage feedback signals; and controlling the power converter according to the at least one current command and controlling the energy buffer according to the power command so as to reduce or eliminate the changes in the voltage at the frequency associated with the drivetrain resonance mode.

The inverter-based resource of any preceding clause, wherein the one or more voltage feedback signals comprise x and y voltage feedback signals.

The inverter-based resource of any preceding clause, wherein the plurality of operations further comprises: calculating an angle rotating at a desired predetermined frequency associated with the inverter-based resource.

The inverter-based resource of any preceding clause, wherein filtering the one or more voltage feedback signals to extract the changes in the voltage at the frequency associated with the drivetrain resonance mode further comprises: filtering, via a first filter, the one or more voltage feedback signals to remove one or more direct current (DC) components associated with a fundamental frequency; and subsequently filtering, via a second filter, the one or more voltage feedback signals to remove high frequency components not associated with the desired predetermined frequency.

The inverter-based resource of any preceding clause, wherein the plurality of operations further comprises: rotating the one or more voltage feedback signals from a synchronous reference frame to a reference frame rotating at the desired predetermined frequency after filtering via the first filter and before filtering via the second filter, wherein in the reference frame, components of a terminal voltage of the inverter-based resource oscillating at the desired predetermined frequency appear as direct current (DC) components.

The inverter-based resource of any preceding clause, wherein determining the at least one current command or the power command based on the filtered one or more voltage feedback signals further comprises: generating, via an integral controller of the controller, an output using the rotated one or more voltage feedback signals, wherein an intended reference voltage at the desired predetermined frequency of the integral controller is set to zero (0) and the output of the integral controller is a shunt current injection needed to drive the changes in the voltage at the predetermined frequency to zero.

The inverter-based resource of any preceding clause, wherein determining the at least one current command or the power command based on the filtered one or more voltage feedback signals further comprises: rotating the output associated with the desired predetermined frequency back to the synchronous reference frame to generate a desired current; and determining the at least one current command or the power command based on the desired current.

The inverter-based resource of any preceding clause, wherein rotating the output associated with the desired predetermined frequency back to the synchronous reference frame further comprises applying a predetermined phase shift setting.

The inverter-based resource of any preceding clause, wherein the energy buffer comprises one of a dynamic brake, a capacitor, or a battery, and wherein the inverter-based resource comprises one of a wind turbine power system, a solar power system, a hydro-generator, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for decoupling a mechanical drivetrain resonance mode of an inverter-based resource from an external electrical system, the inverter-based resource having a power converter, a generator, and an energy buffer, the method comprising:
   receiving, via a controller, one or more voltage feedback signals at a node between the inverter-based resource and the external electrical system;
   filtering, via the controller, the one or more voltage feedback signals to extract changes in a voltage at a frequency associated with the drivetrain resonance mode;
   determining, via the controller, at least one current command or power command based on the filtered one or more voltage feedback signals; and
   controlling the power converter according to the at least one current command and controlling the energy buffer according to the power command so as to reduce or eliminate the changes in the voltage at the frequency associated with the drivetrain resonance mode.

2. The method of claim 1, wherein the one or more voltage feedback signals comprise x and y voltage feedback signals.

3. The method of claim 1, further comprising calculating, via the controller, an angle rotating at a desired predetermined frequency associated with the inverter-based resource.

4. The method of claim 3, wherein filtering the one or more voltage feedback signals to extract the changes in the voltage at the frequency associated with the drivetrain resonance mode further comprises:
   filtering, via a first filter, the one or more voltage feedback signals to remove one or more direct current (DC) components associated with a fundamental frequency; and
   subsequently filtering, via a second filter, the one or more voltage feedback signals to remove high frequency components not associated with the desired predetermined frequency.

5. The method of claim 4, wherein the first filter is a high-pass filter and the second filter is a low-pass filter.

6. The method of claim 4, further comprising:
   rotating, via the controller, the one or more voltage feedback signals from a synchronous reference frame to a reference frame rotating at the desired predetermined frequency after filtering via the first filter and before filtering via the second filter,
   wherein in the reference frame, components of a terminal voltage of the inverter-based resource oscillating at the desired predetermined frequency appear as direct current (DC) components.

7. The method of claim 6, wherein determining the at least one current command or the power command based on the filtered one or more voltage feedback signals further comprises:
   generating, via an integral controller of the controller, an output using the rotated one or more voltage feedback signals,
   wherein an intended reference voltage at the desired predetermined frequency of the integral controller is set to zero (0) and the output of the integral controller is a shunt current injection needed to drive the changes in the voltage at the predetermined frequency to zero.

8. The method of claim 7, wherein determining the at least one current command or the power command based on the filtered one or more voltage feedback signals further comprises:
   rotating the output associated with the desired predetermined frequency back to the synchronous reference frame to generate a desired current; and
   determining the at least one current command or the power command based on the desired current.

9. The method of claim 8, wherein rotating the output associated with the desired predetermined frequency back to the synchronous reference frame further comprises applying a predetermined phase shift setting.

10. The method of claim 1, wherein the energy buffer comprises one of a dynamic brake, a capacitor, or a battery.

11. The method of claim 1, wherein the inverter-based resource comprises one of a wind turbine power system, a solar power system, a hydro-generator, or combinations thereof.

12. An inverter-based resource connected to an external electrical system, the inverter-based resource comprising:
   a generator;
   an energy buffer;
   a power converter coupled to the generator; and
   a controller comprising at least one processor configured to perform a plurality of operations, the plurality of operations comprising:
      receiving one or more voltage feedback signals at a node between the inverter-based resource and the external electrical system;
      filtering the one or more voltage feedback signals to extract changes in voltage at a frequency associated with a drivetrain resonance mode;
      determining at least one current command or power command based on the filtered one or more voltage feedback signals; and
      controlling the power converter according to the at least one current command and controlling the energy buffer according to the power command so as to reduce or eliminate the changes in the voltage at the frequency associated with the drivetrain resonance mode.

13. The inverter-based resource of claim 12, wherein the one or more voltage feedback signals comprise x and y voltage feedback signals.

14. The inverter-based resource of claim 12, wherein the plurality of operations further comprises:
calculating an angle rotating at a desired predetermined frequency associated with the inverter-based resource.

15. The inverter-based resource of claim 14, wherein filtering the one or more voltage feedback signals to extract the changes in the voltage at the frequency associated with the drivetrain resonance mode further comprises:
filtering, via a first filter, the one or more voltage feedback signals to remove one or more direct current (DC) components associated with a fundamental frequency; and
subsequently filtering, via a second filter, the one or more voltage feedback signals to remove high frequency components not associated with the desired predetermined frequency.

16. The inverter-based resource of claim 15, wherein the plurality of operations further comprises:
rotating the one or more voltage feedback signals from a synchronous reference frame to a reference frame rotating at the desired predetermined frequency after filtering via the first filter and before filtering via the second filter,
wherein in the reference frame, components of a terminal voltage of the inverter-based resource oscillating at the desired predetermined frequency appear as direct current (DC) components.

17. The inverter-based resource of claim 16, wherein determining the at least one current command or the power command based on the filtered one or more voltage feedback signals further comprises:
generating, via an integral controller of the controller, an output using the rotated one or more voltage feedback signals,
wherein an intended reference voltage at the desired predetermined frequency of the integral controller is set to zero (0) and the output of the integral controller is a shunt current injection needed to drive the changes in the voltage at the predetermined frequency to zero.

18. The inverter-based resource of claim 17, wherein determining the at least one current command or the power command based on the filtered one or more voltage feedback signals further comprises:
rotating the output associated with the desired predetermined frequency back to the synchronous reference frame to generate a desired current; and
determining the at least one current command or the power command based on the desired current.

19. The inverter-based resource of claim 18, wherein rotating the output associated with the desired predetermined frequency back to the synchronous reference frame further comprises applying a predetermined phase shift setting.

20. The inverter-based resource of claim 12, wherein the energy buffer comprises one of a dynamic brake, a capacitor, or a battery, and wherein the inverter-based resource comprises one of a wind turbine power system, a solar power system, a hydro-generator, or combinations thereof.

* * * * *